United States Patent
Thompson et al.

(10) Patent No.: US 7,103,812 B1
(45) Date of Patent: Sep. 5, 2006

(54) METHOD AND APPARATUS FOR TRACKING MEMORY ACCESS STATISTICS FOR DATA SHARING APPLICATIONS

(75) Inventors: Ryan C. Thompson, Loveland, CO (US); John W. Maly, Laporte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 401 days.

(21) Appl. No.: 10/371,625

(22) Filed: Feb. 21, 2003

(51) Int. Cl.
*G11C 29/00* (2006.01)

(52) U.S. Cl. .................. 714/718; 714/25; 714/724; 714/738; 703/13

(58) Field of Classification Search ............. 714/33, 714/724; 703/13; 710/22; 716/6
See application file for complete search history.

(56) References Cited

U.S. PATENT DOCUMENTS

| | | | |
|---|---|---|---|
| 6,212,667 B1 * | 4/2001 | Geer et al. ............... | 716/6 |
| 6,285,974 B1 * | 9/2001 | Mandyam et al. ........ | 703/13 |
| 2003/0115385 A1 * | 6/2003 | Adamane et al. ........ | 710/22 |
| 2003/0125915 A1 * | 7/2003 | Gabele et al. ........... | 703/13 |

OTHER PUBLICATIONS

IBM Technical Disclosure NN9308675, "Creation of Simulation Testcases for New Hardware on Previous Generation Hardware", Aug. 1, 1993, vol. 36, Issue 8, pp. 675-680.*
Carol A. Logan, "Directions in Multiprocessor Verification", Mar. 28-31, 1995, IEEE Computers and Communications, pp. 29-33.*
Saha et al., "Test Floor Verification of Multiprocessor Hardware", Mar. 27-29, 1996, IEEE Computers and Communications, pp. 373-377.*
Chandra et al., "AVPGEN—A Test Generator for Architecture Verification", Jun. 1995, IEEE VLSI Systems, vol. 3 Issue 2, pp. 188-200.*

* cited by examiner

*Primary Examiner*—Guy Lamarre
*Assistant Examiner*—John P. Trimmings (57) ABSTRACT

A method for testing the correct behavior of an integrated circuit includes forming a list of potential data sharing locations, collecting memory access statistics of the potential data sharing locations, and forming subsequent test case threads to test specialized processing conditions of the integrated circuit based on the memory access statistics of the potential data sharing locations.

27 Claims, 9 Drawing Sheets

METHOD AND APPARATUS FOR TRACKING MEMORY ACCESS STATISTICS FOR DATA SHARING APPLICATIONS

BACKGROUND

As technology continues to infiltrate everyday life, users are demanding increased speed and reliability of computerized equipment. In order to satisfy the demand for increased speed, increasingly powerful and complex processors are being designed and manufactured. However, as the complexity of these processors increases, it becomes more difficult to verify their correct behavior. If a processor fails to function as intended, due to an error, the results could be catastrophic to a user.

In order to verify the behavior of a processor that is still in the developmental stage, developers often use a testcase generator. A testcase generator automatically generates a large number of testcases that it then performs on a processor to test its functionality. A testcase is a text file that contains resource state initialization information and test instructions to be run on a simulator of a processor under development. When a testcase is run, the simulator's resources are initialized to the state specified in the testcase and the instructions specified are executed on the processor simulator being tested. Testcase instructions may include, but are in no way limited to, add, load, and store operations.

Typically, testcase generators randomly select parameters for each testcase in order to create a large number of testcases that cover a wide variety of instructions and test the various functionality of the processor under development. These testcases are run to exercise a processor's control paths more fully than typical program code, which for performance reasons, often deliberately avoids performing operations that it is known are difficult for a processor to perform.

Some testcase generators are able to further evaluate a processor under development by generating what are commonly known as "predictable" testcases. Predictable testcases occur when a testcase generator is able to predict the sequence of instructions and data that a processor will use while performing a testcase. When performing predictable testcases, the testcase generator predicts the final state of the processor resources. The predicted final state of the processor resources is then compared to the actual final state of the simulated processor under development to determine whether the correct results were achieved. If the predicted and the actual final states of the simulated processor under development differ, an error has occurred and the processor should be debugged either manually or automatically.

Many processors also have the capability to simultaneously run multiple "threads" of code. When multiple threads of code are simultaneously being performed, a condition known as data sharing may occur. Data sharing occurs when two or more separate threads operate on the same "line" of data. A "line" of data is the smallest set of data that may be loaded into cache in a particular processor. For example, a processor may have a data line size of 32-bytes. If a thread uses any byte of data on a particular 32-byte line, the entire 32-byte line will be loaded into cache of the processor. If an additional thread of code operates on the same line of data, both threads may access the cached data resulting in a data sharing situation.

SUMMARY

In one of many possible embodiments, the present invention provides a method for testing the correct behavior of an integrated circuit including forming a list of potential data sharing locations, collecting memory access statistics of the potential data sharing locations, and forming subsequent test case threads to test specialized processing conditions of the integrated circuit based on the memory access statistics of the potential data sharing locations.

Another embodiment of the present invention provides an apparatus capable of testing the correct behavior of an integrated circuit including a processor, a memory storage unit, and a bus communicatively coupling the processor and the memory storage unit, wherein the memory storage unit includes a machine readable medium having instructions thereon for causing the apparatus to form a list of potential data sharing locations, collect memory access statistics of the potential data sharing locations, and form subsequent test case threads that test specialized processing conditions of the integrated circuit based on the memory access statistics of the potential data sharing locations.

BRIEF DESCRIPTION OF THE DRAWINGS

The accompanying drawings illustrate various embodiments of the present invention and are a part of the specification. The illustrated embodiments are merely examples and do not limit the scope of the invention.

Throughout the drawings, identical reference numbers designate similar, but not necessarily identical, elements.

DETAILED DESCRIPTION

The present specification describes a method for identifying data locations for performing predictable data sharing operations by a testcase generator. According to one exemplary implementation, described more fully below, a testcase generator identifies possible data sharing locations based upon a number of predetermined biases. These possible data sharing locations are then selectively chosen to test specialized data sharing operations based upon memory access statistics of the data sharing locations. In the following description, for purposes of explanation, numerous specific details are set forth in order to provide a thorough understanding. It will be apparent, however, to one skilled in the art that these embodiments can be practiced without these specific details.

Reference in the specification to "one embodiment" or "an embodiment" means that a particular feature, structure, or characteristic described in connection with the embodiment is included in at least one embodiment of the invention. The appearance of the phrase "in one embodiment" in various places of the specification are not necessarily all referring to the same embodiment.

Exemplary Overall Structure

Figure 1:
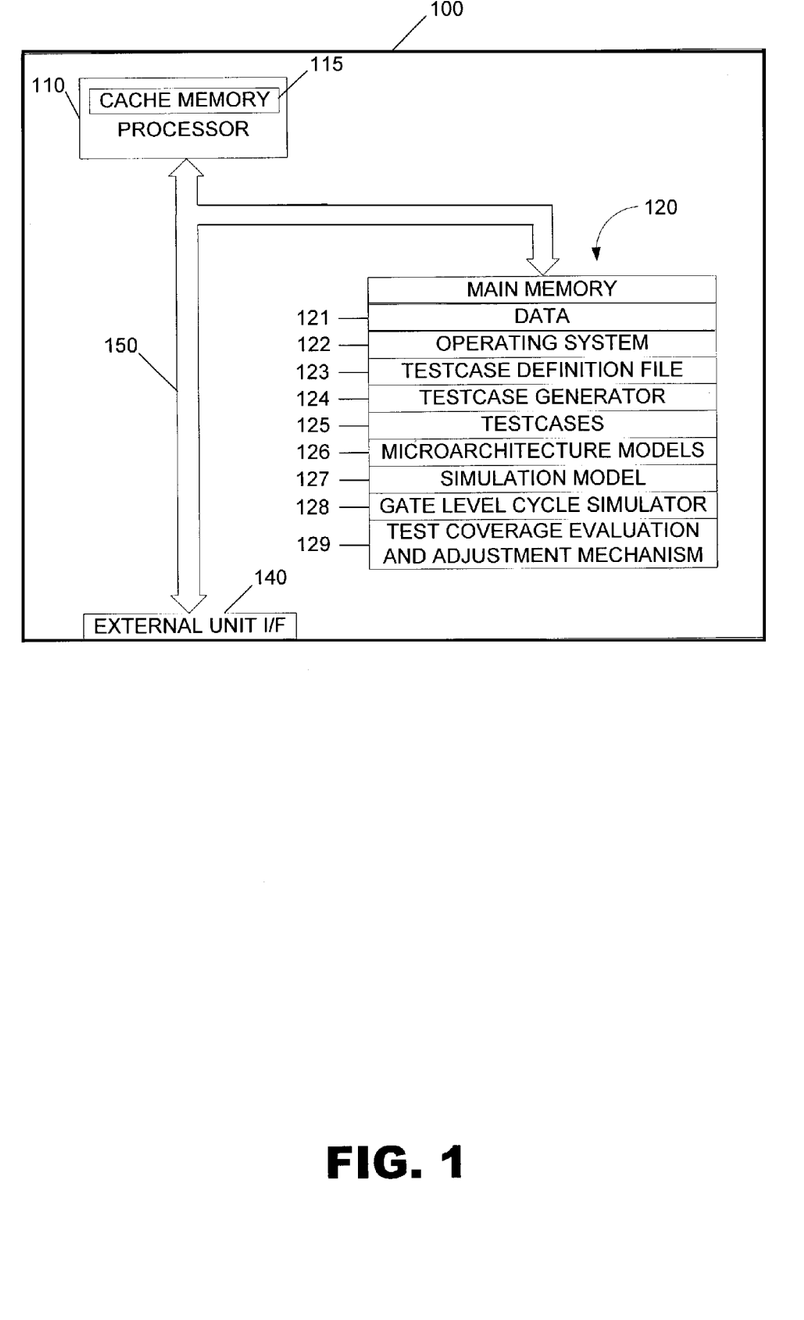
FIG. 1 illustrates the components of a computer system for testing specific conditions of multi-threaded processors according to a representative embodiment.

A computer system (100) for testing the functionality of a processor under development is illustrated in FIG. 1. As shown in FIG. 1, the computer system (100) includes a processor (110) connected to a main memory (120) and an external unit interface (140). The computer system (100) of the present processor testing system may be any computer system capable of performing testcase generation and analysis, regardless of whether the computer system is a complicated multi-user computing apparatus, a single user workstation, or a personal computer. The system components (120,140) are interconnected through the use of a system bus (150).

The external unit interface (140) illustrated in FIG. 1 may be used to connect terminals, network interfaces, mass storage devices such as a floppy disk drive, or any combination thereof to the computer system (100). The external unit interface (140) may include, but is in no way limited to parallel ports or universal serial bus (USB) ports.

The main memory (120) illustrated in FIG. 1 preferably includes data (121), an operating system (122), a testcase definition file (123), a testcase generator (124), testcases (125), one or more microarchitecture models (126), a simulation model (127), a gate level cycle simulator (128), and a test coverage evaluation and adjustment mechanism (129). While each individual component of the main memory (121–129) is shown to reside in the main memory (120), it is within the scope of the present processor testing system that the individual components of the main memory are not necessarily all completely contained in the main memory (120) at the same time. The term "memory" is used herein to generically refer to the entire virtual memory of the computer system (100).

The data (121) component of the main memory (120) represents any data that serves as input to or output from any program in the computer system (100). The operating system (122) illustrated in FIG. 1 is preferably a UNIX based multitasking operating system, however, the computer system may include any operating system capable of managing the resources of the computer system (100). Testcases (125) are generated by the testcase generator (124), which generates the testcases (125) in accordance with one or more parameters specified in the testcase definition file (123). The testcase generator (124) suitably generates a relatively large number of testcases biased according to parameters stored in the testcase definition file (123). The testcase definition file (123) causes the testcase generator (124) to generate non-random testcases. According to one embodiment of the present system, the testcase generator generates testcases that are more likely to test specific behavior of the processor under development as specified by the parameters in the testcase definition file (123). If no testcase definition file (123) were present, the testcase generator (124) would generate truly random testcases (125).

The microarchitecture models (126) illustrated in FIG. 1 are a collection of low-level models that describe possible behavior of the processor under development. The term "microarchitecture models" as used herein refers to any type of model that may represent the possible behaviors of a processor under development or any other integrated circuit. Preferably, the microarchitecture models (126) specify detailed behavior of the processor under development at a lower level than traditional architectural models. The microarchitecture models (126) are used to produce the predicted final state of the processor under development's resources when processing a testcase.

The simulation model (127) illustrated in FIG. 1 is a model of the processor under development that is compiled from a high-level hardware description language such as Very High Speed Integrated Circuit (VHSIC) hardware Description Language (VHDL) or Verilog. More specifically, the simulation model (127) is a model of the processor under development in a format that can be interpreted by the gate level cycle simulator (128), which applies the testcases (125) to the simulation model (127) to determine if the simulated processor under development behaves as expected. The test coverage evaluation and adjustment mechanism (129) is used to compare the results of running testcases (125) on the simulation model (127) to the microarchitecture models (126) thereby searching for resource deviations.

The processor (110) illustrated in FIG. 1 may be constructed from one or more microprocessors and/or integrated circuits, and may include multiple instruction pipelines that can execute instructions in parallel. The processor (110) executes program instructions that are both stored and accessed in the main memory (120). As illustrated in FIG. 1, the processor (110) includes a cache memory (115). The processor (110) may store data in the cache memory (115) thereby increasing processor speed. Processor speed is increased by the use of the cache memory (115) because the cache memory (115) is more readily available than regular random access memory (RAM). The cache memory (115) illustrated in FIG. 1 is a level 1 (L1) cache memory meaning it is located on the processor itself. However, it is within the scope of the present processor testing system that the cache memory be L1 cache memory, L2 (level 2 cache memory that is located on a second chip such as an expansion card), or RAM. Although the computer system (100) illustrated in FIG. 1 shows a single processor and a single system bus, the present processor testing method and apparatus may be practiced using a computer system incorporating multiple processors and/or multiple buses.

For ease of explanation only, the present processor testing apparatus has been, and will continue to be described in the context of a fully functional computer system. However, the present processor testing apparatus is capable of being distributed as a program product in a variety of forms (such as recordable type media and transmission type media). Additionally, the principles described herein apply equally regardless of the particular type of signal bearing media actually used to carry out the distribution.

Exemplary Implementation and Operation

Referring again to FIG. 1, the processor (110) of the computer system (100) is capable of testing the various data sharing capabilities of a processor under development, whose characteristics are represented by a simulation model (127). More specifically, the present computer system (100) performs a method for identifying and incorporating data locations that may be shared among multiple threads resulting in predictable final memory states. By tracking a number of memory access statistics related to the data lines that may potentially be shared, the present processor testing system is able to predictably test and evaluate the behavior of a processor under development while processing under a number of specialized processing conditions. Predictability is difficult to ensure when performing data sharing operations because it is almost impossible to predict which thread will perform a memory access first. In order to maintain a predictable final processor state, two data sharing conditions must be avoided: first, a thread should not perform a write (store) function to a byte that another thread reads (loads); and second, two threads should not both write (store) to a single byte. According to one embodiment of the present processor testing system, the two data sharing conditions mentioned above have been simplified to a single condition located in the testcase definition file (123): do not store to any location that another testcase thread uses (either loads or stores).

While performing the above-mentioned condition, a testcase generator is able to choose addresses and access sizes for testcase threads of code to perform predictable false sharing, which is defined in the next paragraph. The processor testing system is biased towards finding data locations for stores (no previous thread has stored/loaded) before finding locations for loads (no previous thread has stored) because a location suitable for the performance of a store operation may also perform as a load location. Moreover, once a location is identified as a store or load location it is removed from the list of possible data sharing locations so it will no longer be analyzed. The system is also biased towards finding locations for larger loads or stores before smaller ones.

Figure 2A:
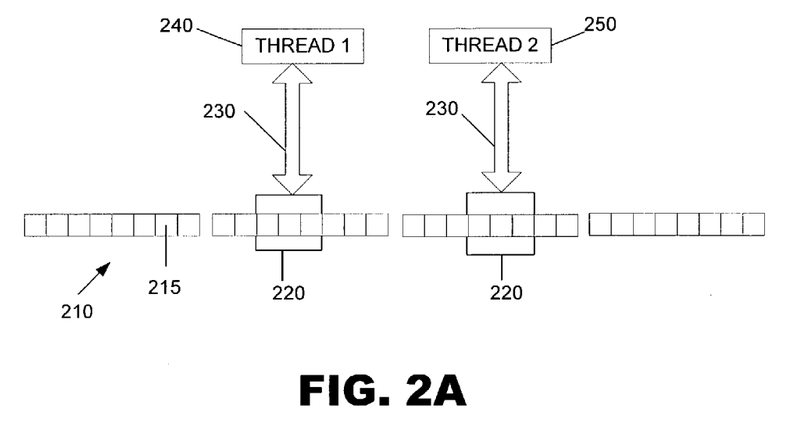
FIG. 2A illustrates false data sharing according to one embodiment.

By only storing to locations that are unused by another testcase thread of code, one embodiment of the present processor testing system is constrained to false sharing configurations. FIG. 2A illustrates what is meant by the term "false data-sharing configuration" according to one embodiment of the present processor testing system. As illustrated in FIG. 2A, when a testcase thread (240, 250) has been generated by a testcase generator, the testcase thread accesses a designated line of data. Once the data line is requested, the executing processor caches the line of data. A cached line of data (210) such as the one illustrated in FIG. 2A is comprised of a designated number of bits (215) of data. FIG. 2A illustrates a cached data line (210) of 32 bits, however, any number of bits may be cached. Data is shared when it is accessed (230) (either loaded or stored) by more than one thread (240, 250). When data is being shared between two threads, the threads may be running on the same processor, on separate processor cores on the same chip, or on separate processors in the same system. The only limitation to data sharing is that the threads must have access to the same line of data. False sharing occurs when two threads access the same cached data line (210) but access different bytes of data (220) within the data line, as illustrated in FIG. 2A.

Figure 2B:
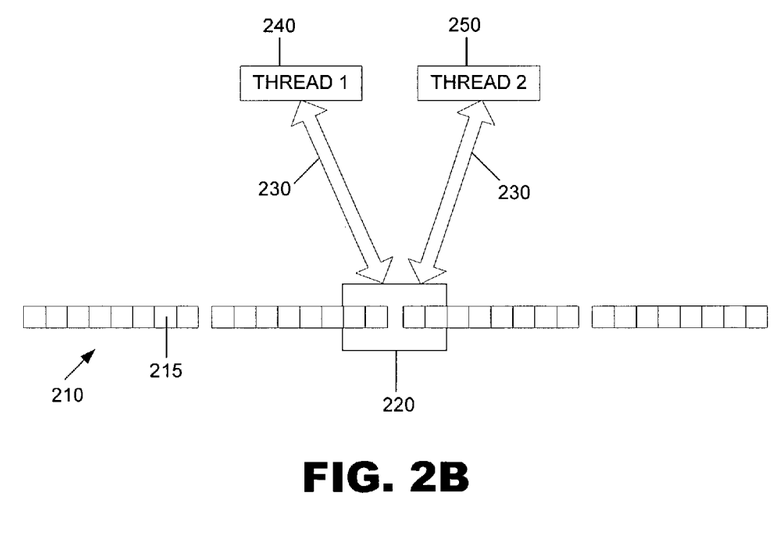
FIG. 2B illustrates true data sharing according to one embodiment.

True data sharing occurs when two or more threads (240, 250) access the same bytes of cached data (220) as illustrated in FIG. 2B. The present example will be described, for ease of explanation only, as being biased towards identifying possible false sharing data locations. However, the example described may also be used to identify possible locations for performing true data sharing.

Figure 3:
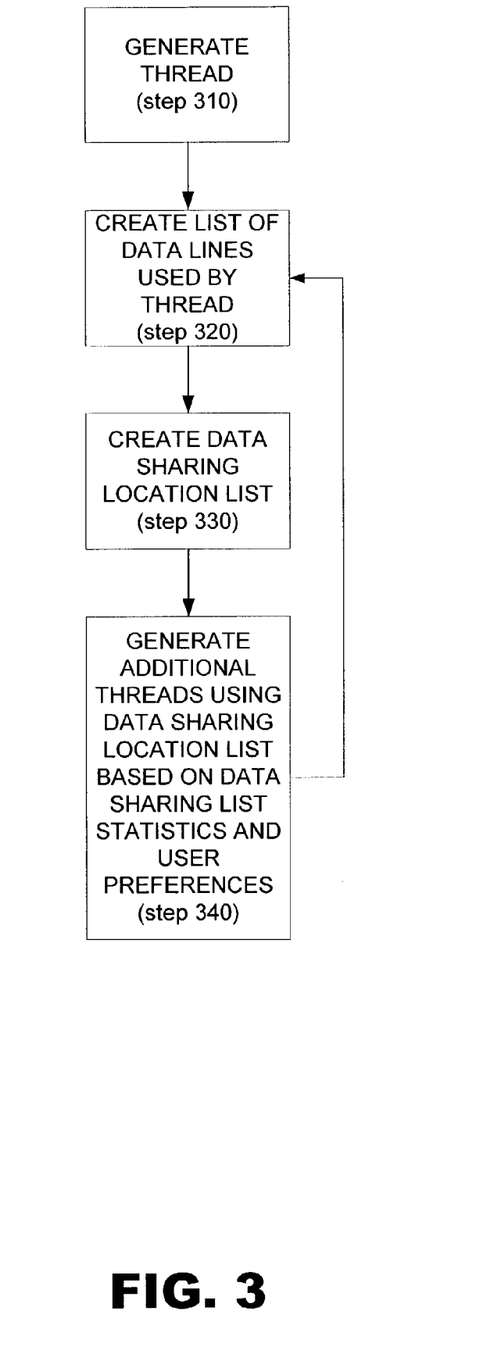
FIG. 3 is a flow chart illustrating a method for identifying and recording memory access statistics in connection with predictable data sharing locations according to a representative embodiment.

FIG. 3 illustrates steps that may be performed by a testcase generator to test the data sharing capabilities of a processor under development when performing specialized processing conditions. As shown in FIG. 3, the testcase generator (124; FIG. 1) begins testing a processor under development by producing a testcase thread of code (step 310) designed to test the functionality of the processor under development. Once the first thread is generated (step 310), a list of the data lines used by that thread is produced (step 320). The list of data lines used by each thread produced includes the address of the cache line where the data line is located, the bytes of the data line the generated thread stores, and the bytes of the data line the generated thread loads. This list of data lines used by the generated thread is then used to create a list of possible data sharing locations (step 330). For each data line accessed, the testcase generator (124; FIG. 1) performs a test-and-check method to determine whether the data line may further be used as a data sharing location. Initially, a data sharing operation is chosen, and the data line is analyzed for compatibility with the chosen data sharing operation according to the conditions designated in the testcase definition file. If the data sharing operation selected can be performed safely (a false data sharing condition), then the information regarding the identified data line is added to the list of possible data sharing locations (step 330).

Each entry on the list of data sharing locations may include the address of the possible data sharing location, whether the possible operation is a load or store operation, and the number of bytes in the data line that are available for the possible operation. Moreover, additional memory access statistics may be collected in order to facilitate the testing of specialized processing conditions. The additional memory access statistics collected may include, but are in no way limited to, the size of the memory access performed on the identified location, the testcase instruction number of current and previous accesses to the identified location, the number of loads or stores that access the identified data location, whether memory accesses performed on the identified location were performed using physical or virtual addresses, and if the accesses were performed by virtual address, the virtual address used. When the location and the operation available on the data line have been identified and stored along with other memory access statistics for the identified data line in the main memory (120; FIG. 1) or other accessible data storage device, the testcase generator continues the processor testing operation by generating additional testcase threads. By using the updated list of possible data sharing locations (step 340) and their memory access statistics, the additional testcase threads generated by the testcase generator may be specifically tailored to test the functionality of the processor under development while performing specialized data sharing conditions. The updated list of possible data sharing locations and their memory access statistics are used to select the best available data location to predictably test the data sharing functionality of the processor under development.

Figure 4:
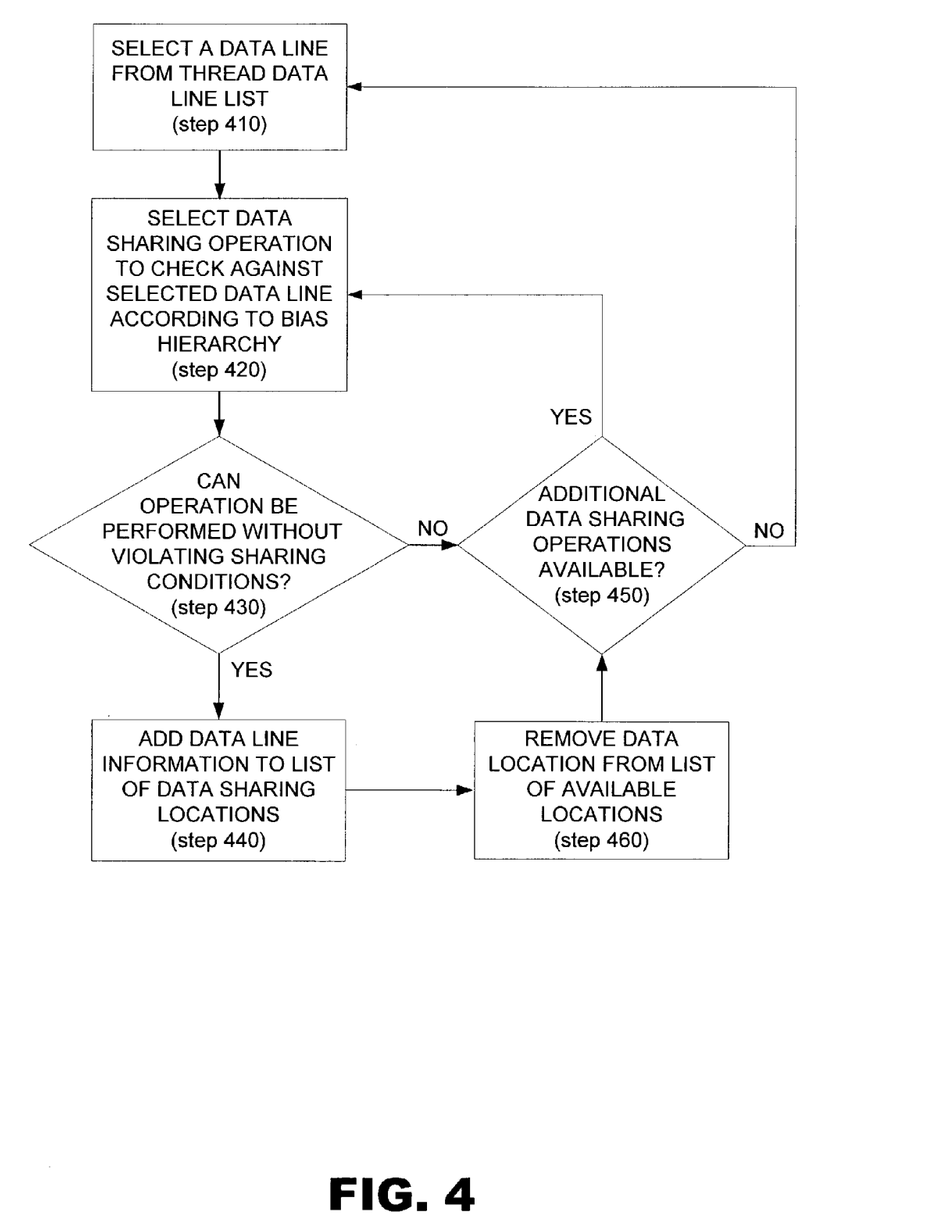
FIG. 4 is a flow chart illustrating a method for creating a list of possible data sharing locations according to one embodiment.

FIG. 4 further illustrates the test-and-check method used by the testcase generator to create the list of possible data sharing locations (step 330; FIG. 3). Creating the list of possible data sharing locations begins as the testcase generator (124; FIG. 1) selects (step 410) a data line from the list of data lines used by the previously generated threads (step 320; FIG. 3). Once a data line has been selected, the testcase generator selects a data sharing operation to be checked against the selected data line (step 420). Since all the data lines in the list of data lines used by previously generated threads have at least one operation being performed on them, any additional operations that are performed on the data line will cause data sharing to occur. The potential data sharing operations to be checked against the data lines are selected according to a designated bias hierarchy (step 420) contained within the testcase definition file (123; FIG. 1).

Figure 5:
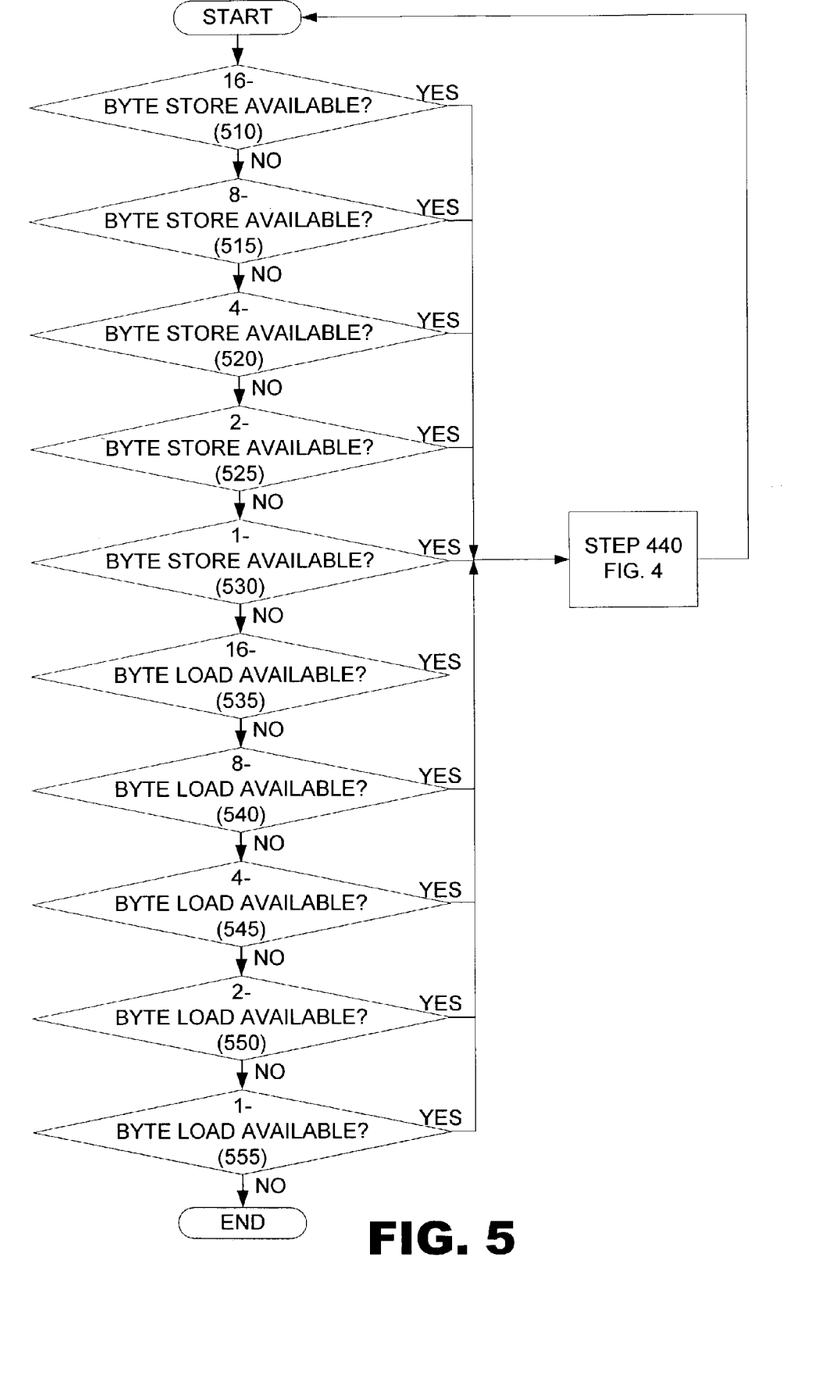
FIG. 5 is a flow chart illustrating a bias hierarchy decision algorithm according to one embodiment.

Once the initial data sharing operation to be checked has been selected (step 420) using the bias hierarchy illustrated in FIG. 5, the selected data line is checked for compatibility with the selected data sharing operation (step 430). If the selected data sharing operation (step 420) may be performed on the selected data line without violating the data sharing conditions, then the data line information and memory access statistics are added to the list of data sharing locations (step 440). As mentioned above, the memory access statistics collected for each potential data sharing location may include, but is in no way limited to, the address, the possible operation that may be performed, the number of bytes available, the size of the access performed, the testcase instruction number of previous threads that have accesses the data line location, the number of loads or stores that access the data line location, whether accesses performed on the data line location were performed by physical or virtual addresses, and if the accesses were performed by virtual address, the virtual address used. Once the data line statistics have been added to the list of data sharing locations (step 440), the testcase generator inquires whether there are additional data sharing operations available according to the bias hierarchy (step 450). If there are additional data sharing operations available, then the testcase generator continues selecting and checking data sharing operations until the bias hierarchy is exhausted. Once there are no additional data sharing operations to be checked on the selected data line, the testcase generator selects a new data line from the thread data line list (step 410) and begins the checking process again.

If the initial data sharing operation (step 420) selected by the testcase generator cannot be performed on the selected data line without violating the data sharing conditions (step 430), the testcase generator determines whether there are additional data sharing operations that may be checked against the current data line according to the bias hierarchy (step 450). If there are additional data sharing operations available, the testcase generator selects and checks the additional data sharing operations against the selected data line (step 420). However, if there are no additional data sharing operations available to be checked, the testcase generator selects a new data line from thread data line list (step 410) and begins checking the new data line for data sharing locations. According to the process illustrated in FIG. 4, if a selected operation cannot be performed without violating the data sharing conditions, another operation is chosen and tested until either an appropriate operation is found or all possible operations are checked and fail.

FIG. 5 illustrates one embodiment of the operation selection bias hierarchy used by the testcase generator to identify potential data sharing locations. The operation selection is biased towards performing operations for which it may be more difficult to find possible locations. In general, store operations are attempted before load operations because any location to which a store may be performed may also be an appropriate location for a load operation. The opposite, however, is not true. If data locations are checked for loads first, all possible store locations will first be identified as load locations and no store locations will be available. Additionally, larger byte operations are attempted before smaller byte operations. The example bias hierarchy illustrated in FIG. 5 demonstrates applying the data sharing bias to a processor capable of storing data lines of 32-bytes. However, it is possible to apply the data sharing bias to processors capable of storing data lines of any size. As illustrated in FIG. 5, a 32-byte processor may support operations of 1, 2, 4, 8, and 16-bytes.

The data sharing bias illustrated in FIG. 5 begins by attempting large operations first as indicated by step (510). Larger operations are attempted first, because a location that supports a large operation may also support any operation of a smaller number of bytes. If the smallest operation was checked first, every available data location would be taken by small operations and no larger data operations could be performed or tested. According to the 32-byte hierarchy, the testcase generator initially checks the selected data line for a location where 16-bytes of store data operation may be performed (510). A store can only take place on a byte that has not been loaded or stored by any other thread. If an available location is found, the memory access statistics corresponding to the location, size, operation available, and other requested statistics are sent to the list of possible data sharing locations (step 440; FIG. 4) and the identified location is removed from the list of available locations to be searched (step 460; FIG. 4). When an available data sharing location has been found and has been added to the list of data sharing locations (step 440; FIG. 4), the testcase generator determines whether the data line containing the data sharing location has been checked for every possible data sharing size and operation (step 450; FIG. 4). If every operation and size has not been checked according to the bias hierarchy, the checking process continues. If the entire data line has been checked and a location for an operation of 16-bytes of store has not been located, the hierarchy dictates that the testcase generator continue by checking for locations where 8-bytes of store operation may be performed (515). The check cycle continues by checking for 4-byte store locations (520), 2-byte store locations (525), and 1-byte store locations (530).

When the testcase generator has determined that there are no remaining store locations available according to the bias hierarchy, the testcase generator begins to check the selected data line for possible load locations. Loads can take place on any bytes that have not been stored by any other thread. Again the testcase generator begins checking for large operations first. The order illustrated in FIG. 5 begins checking for 16-byte load locations (535), 8-byte load locations (540), 4-byte load locations (545), 2-byte load locations (550), and 1-byte load locations (555). Once the testcase generator has gone through the entire bias hierarchy without detecting a potential data sharing location, the testcase generator selects a new data line and begins the process again (step 410; FIG. 4).

Figure 6:
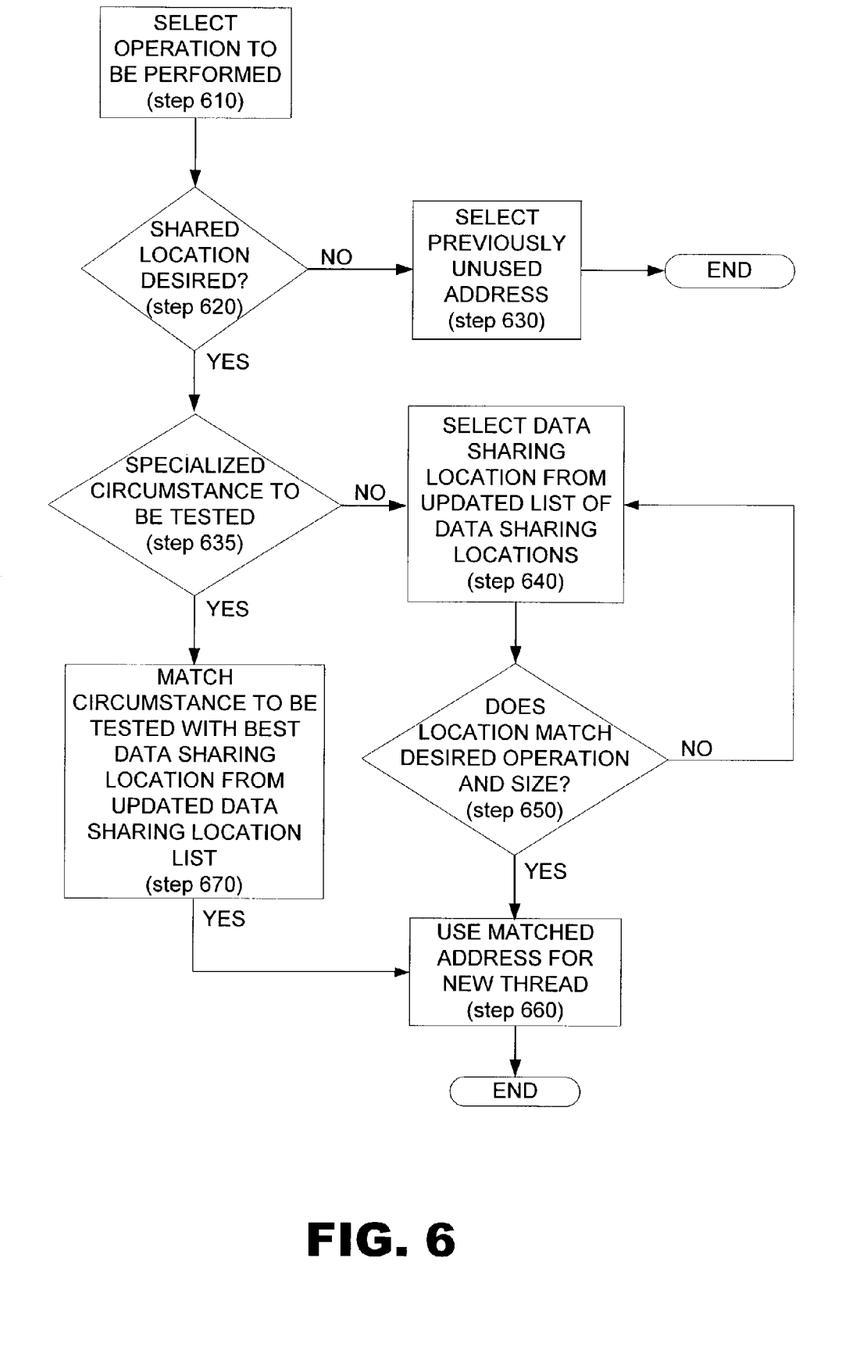
FIG. 6 is a flow chart illustrating a method for generating testcase threads that may test specific conditions of a processor according to one embodiment.

When one or more data lines have been checked for possible data sharing locations, the testcase generator may then use the generated list of memory access statistics corresponding to possible data sharing locations to generate subsequent testcase threads. FIG. 6 illustrates one embodiment of a thread location selection process performed by the testcase generator. As illustrated in FIG. 6, the testcase generator begins by selecting a desired operation to be tested on the processor under development (step 610). The testcase generator will either perform a load operation or a store operation. When the operation to be performed has been selected, the processor determines whether the testcase generator desires to test a shared location or not (step 620). Both the selection of the desired operation and the determination of whether shared or unshared data locations are preferred may occur in any order and may either be randomly selected, selected according to a test schedule, or manually entered by a user.

If a shared location is not desired, the processor may select a previously unused data address (step 630) to assure that no data sharing will occur. However, if the user of the testcase generator desires to test the data sharing capabilities of the processor under development, the testcase generator then determines whether a specialized data sharing situation is to be tested (step 635). If a specialized data sharing situation is not to be tested, the testcase generator may select a data sharing location from the list of available data sharing locations (step 640). When a data sharing location is selected from the list of available data sharing locations (step 640), the testcase generator determines whether the selected data sharing location matches the operation and size of the process to be performed (step 650). If the selected data sharing location does not match the operation and/or size of the process to be performed by the testcase generator, then the testcase generator selects a new data sharing location from the updated list of data sharing locations (step 640). When a suitable data sharing location is found, the testcase generator uses the matched data address for the desired testcase thread (step 660) and the testcase is performed. When selecting a data sharing location from the updated list of data sharing locations where a specialized data sharing situation is not to be tested (step 640), the first suitable location that is identified in the list is used. However, any number of methods may be used in choosing a suitable location without straying from the scope of the present processor testing system.

If the user has indicated that a specialized data sharing condition is to be tested by the current thread being formed (yes; step 635), the testcase generator may perform a check operation on the updated list of data sharing locations to identify the best available data sharing location for performing the desired data sharing situation (step 670). According to one embodiment, the best available data sharing location is identified through the use of the collected memory access statistics. When the best available data sharing location has been identified (step 670), the identified location is used for the current testcase thread (step 660).

A number of specialized data sharing conditions may be selected and tested by the present processor testing apparatus. Examples of possible data sharing situations that may be of interest to a user are illustrated in FIGS. 7A–7C and include, but are in no way limited to performing data sharing on data lines that have been accessed multiple times by multiple threads, performing data sharing on a data line that is accessed at approximately the same "time" by each testcase, and/or performing data sharing on a data line that is accessed through virtual addressing.

Figure 7A:
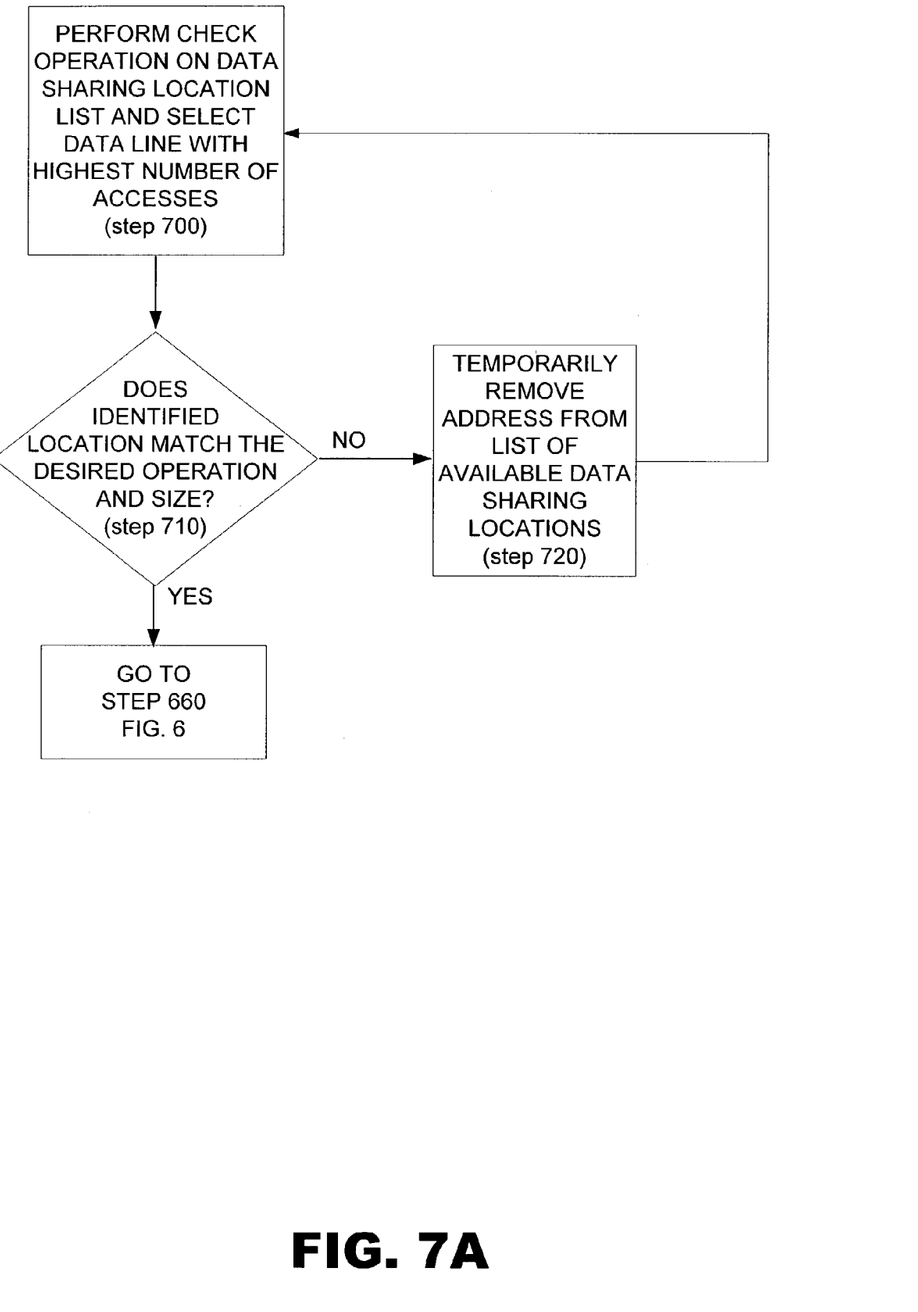
FIG. 7A is a flow chart illustrating a method for selecting data sharing locations that will test data sharing of locations with multiple memory accesses according to one embodiment.

FIG. 7A illustrates one embodiment of a decision algorithm that may be performed by a testcase generator when testing the data sharing characteristics of a processor accessing a data line that has been accessed multiple times by multiple threads. According to one embodiment of the present processor testing apparatus, if a user indicates a desire to perform data sharing on a line that will get accessed many times by multiple threads, the function generator may begin by performing a check operation on the data sharing location list (step 700). The check operation analyzes the number of load or store access statistics collected for each data location. When the list of possible data sharing locations has been analyzed, the function generator may select the data location with the highest number of accesses (step 700). When the possible data sharing location has been identified, the function generator determines whether the location is able to accommodate the operation and size of the desired operation (step 710). If the identified location is not able to accommodate the desired operation or size, the identified location is temporarily removed from the list of available data sharing locations (step 720). The identified location is removed from the list of possible data sharing locations so that when the check operation is again performed on the data sharing location list (step 700), the second most frequently accessed data line will be retrieved. Again the identified location is analyzed for compatibility with the desired operation and size. This process is performed until a data line is located that can accommodate the desired operation and size. Once located, the matched data address is used in forming the testcase thread (step 660; FIG. 6).

Figure 7B:
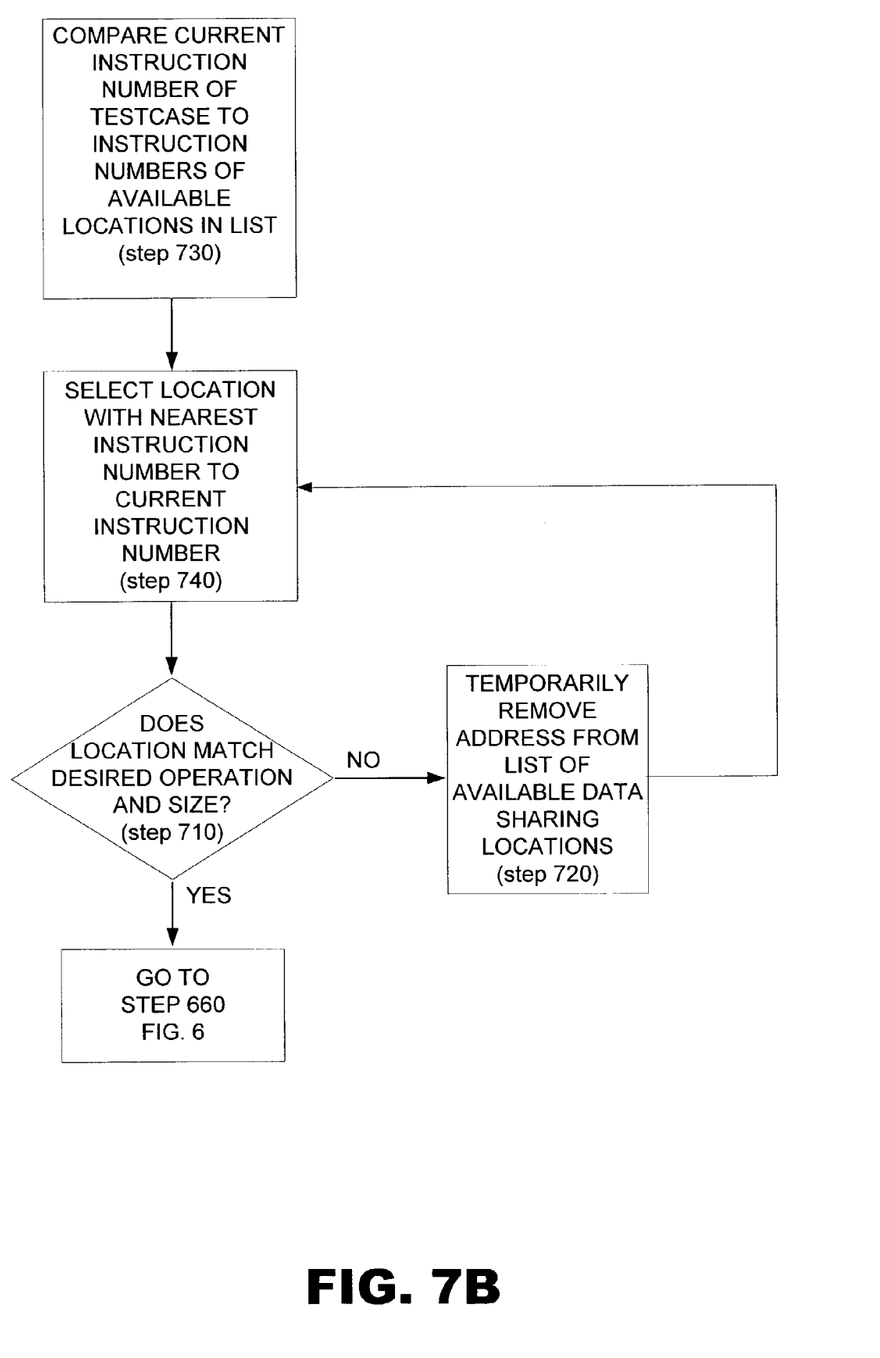
FIG. 7B is a flow chart illustrating a method for selecting data sharing locations that will test data sharing between threads with similar instruction numbers according to one embodiment.

FIG. 7B illustrates a decision algorithm that may be performed by a testcase generator when testing the data sharing characteristics of a processor under development while performing multiple memory accesses that occur around the same "time" in their respective testcases. Testcases are comprised of multiple testcase threads that are sequentially executed. It may be desirable to test the performance of a processor under development where data sharing occurs between two testcase threads that have the same or closely similar instruction numbers. As illustrated in FIG. 7B, the testcase generator first performs a check operation on the data sharing location list to compare the instruction number of the testcase thread being formed to the instruction numbers of the testcases that have previously accessed the available data sharing locations (step 730). This operation is performed by comparing the instruction number of the thread being formed to the testcase instruction numbers of the previously accessing threads. These memory access statistics may have been collected while forming the list of available data sharing locations (step 330; FIG. 3). Once all of the available data sharing locations have been checked, the data sharing location that is accessed by a thread with the nearest instruction number to the instruction number of the thread being formed is selected (step 740). The testcase generator then analyzes the selected data line to see if the selected data line can accommodate the desired operation and size without violating the conditions in the testcase definition file (step 710). If the selected data line is unable to accommodate the desired operation or size, then the identified location is temporarily removed from the list of available data sharing locations and the next data line that is accessed by testcase threads with instruction numbers similar to the instruction number of the thread being formed is selected and tested for compatibility with the desired operation and size. This iterative process is performed until either a data line has been identified that has a similar instruction number and can accommodate the desired operation and size without violating the conditions specified in the testcase definition file, or all the available data lines have been checked and failed. Once identified, the matching data address is used to form the current thread (step 660; FIG. 6), thereby testing the data sharing capabilities of a processor under development when the data sharing occurs between two testcase threads with similar instruction numbers.

Figure 7C:
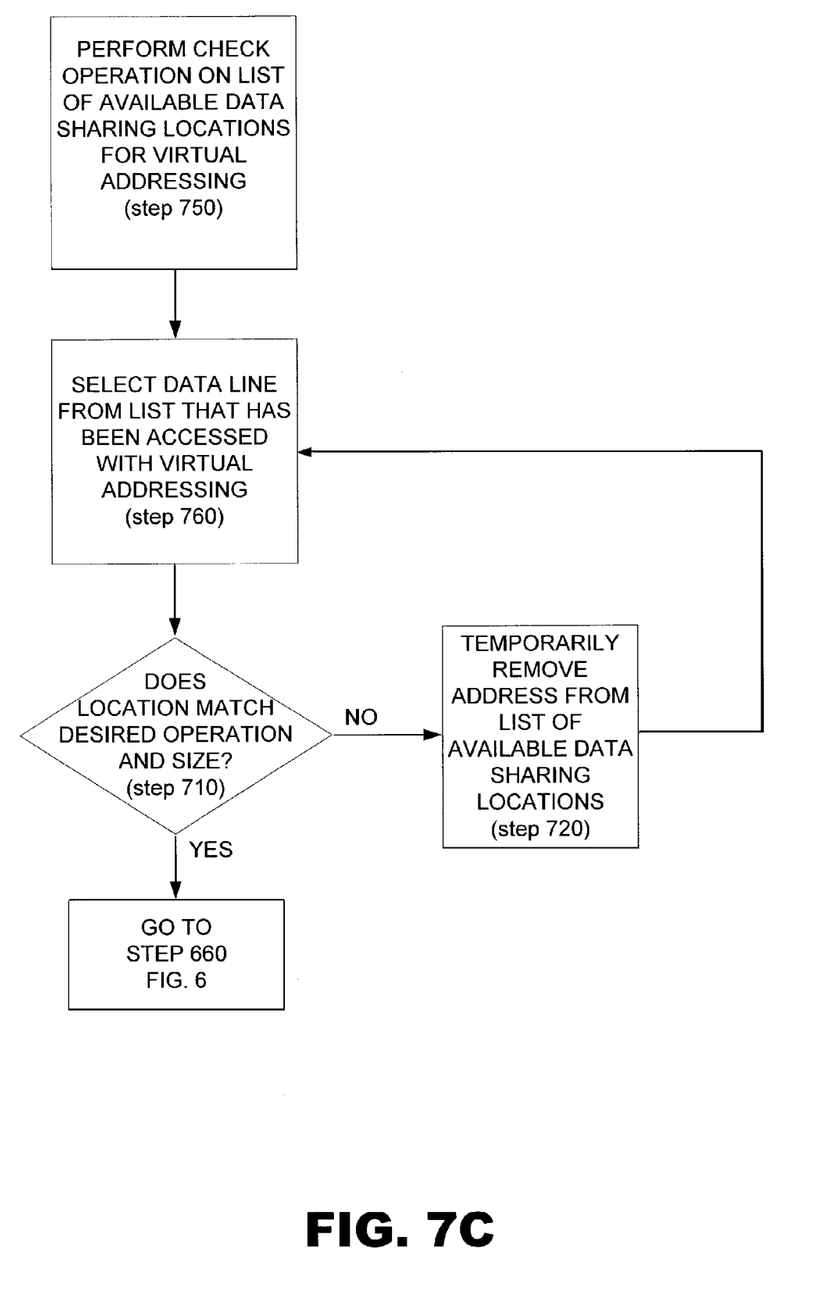
FIG. 7C is a flow chart illustrating a method for selecting data sharing locations that will test data sharing between threads that are addressed using virtual addressing according to one embodiment.

FIG. 7C illustrates yet an additional embodiment of a data sharing trait that may be tested by the present processor testing apparatus. Data lines have traditionally been located in a processor system by their physical address. A data line's physical address is the actual address of the line in the physical memory. However, many modern processors allow "virtual addressing." Virtual addressing allows a program that is running on a processor to specify virtual addresses to use in identifying data lines. The virtual addresses are subsequently mapped to physical addresses by a translation lookaside buffer (TLB) on the processor. It is possible for several virtual addresses to map to the same physical address. For any memory access, the instruction may specify a virtual or a physical address.

As illustrated in FIG. 7C, when a user desires to test the data sharing capabilities of a processor where the data line is addressed using virtual addressing modes, the testcase generator begins by performing a check operation on the memory access statistics list of available data sharing locations. The testcase generator checks the statistics that were collected when forming the list of available data sharing locations for data lines that were addressed using a virtual addressing mode (step 750). When the virtually addressed data lines have been identified, one is selected for the testcase thread being formed (step 760). Once selected, the testcase generator analyzes the selected data line for compatibility with the desired operation and size (step 710). If the desired operation and size cannot be performed on the selected data line without violating the conditions in the testcase definition file, the selected data line is temporarily removed from the list of available data sharing locations (step 720), and an additional data line is selected from the list of virtually addressed data lines (step 760) and checked for compatibility (step 710). This iterative process continues until either all the available data sharing locations are tested and fail, or a virtually addressed data line has been identified that is capable of performing the desired operation and size (step 710). When an appropriate data line has been identified, it is used to form the current testcase string (step 660; FIG. 6).

Once testcase threads have been formed according to any one of the methods illustrated in FIGS. 7A–7C, the testcase threads may be applied to a simulation model (127; FIG. 1) of a processor under development using the gate level cycle simulator (128; FIG. 1) and to a microarchitecture model (126; FIG. 1) of the processor under development. The final state of the resources caused by applying the testcase threads to the simulation model and the microarchitecture model may then be compared using the test coverage evaluation and adjustment mechanism (129; FIG. 1) to check for correct behavior. While specific examples of special conditions have been illustrated using FIGS. 7A–7C, it is within the scope of the present processor testing system that any number of data line statistics may be collected and used to facilitate the testing of specialized conditions.

According to one embodiment of the processor testing system, only aligned addresses are permitted for load and store operations. To be "aligned", an address must be evenly divisible by the size of the operation to be performed. By way of example, for a 16-byte operation to be performed, the address must be evenly divisible by 16. For a 2-byte operation, the address must be evenly divisible by 2, etc. However, it is possible to apply the biased identification method to systems where alignment is not required.

In conclusion, the principles disclosed herein allow for the identification and incorporation of specialized data sharing situations. Specifically, a trait based search pattern is used along with a biased search hierarchy to identify available false data sharing locations that are useful for testing specialized processor situations. By testing specialized data sharing situations, both predictability and reliability of the processor under development are enhanced.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method for testing the correct behavior of an integrated circuit comprising:
    forming a list of potential data sharing locations;
    collecting memory access statistics of said potential data sharing locations; and
    forming subsequent test case threads to test specialized processing conditions of said integrated circuit based on said memory access statistics of potential data sharing locations.

2. The method of claim 1, wherein said memory access statistics further comprise the size of memory accesses that were performed on said data sharing location.

3. The method of claim 1, wherein said memory access statistics further comprise the number of loads and stores that access said data sharing location.

4. The method of claim 1, wherein said memory access statistics further comprise determining whether a memory access of said data sharing location was performed using virtual addressing.

5. The method of claim 3, wherein said forming subsequent test case threads to test specialized processing conditions of said integrated circuit comprises forming a testcase thread that accesses one of said data sharing locations that has been accessed numerous times based on said memory access statistics.

6. The method of claim 4, wherein said forming subsequent test case threads to test specialized processing conditions of said integrated circuit comprises forming a testcase thread that accesses one of said data sharing locations that was accessed using virtual addressing based on said memory access statistics.

7. The method of claim 6, wherein said integrated circuit comprises a processor under development.

8. The method for testing the correct behavior of an integrated circuit of claim 1, wherein said forming a list of potential data sharing locations comprises:
    selecting a data line from a list of data lines used by a previously generated thread; and
    analyzing said data line for possible data sharing locations based on a bias hierarchy.

9. The method for testing the correct behavior of an integrated circuit of claim 8, wherein said bias hierarchy comprises:
    initially checking said data line for false data sharing store locations;
    checking said data line for false data sharing load operations after said false data sharing store locations have been identified; and
    checking for larger data sharing locations prior to checking for smaller data sharing locations.

10. The method for testing the correct behavior of an integrated circuit of claim 9, wherein said collecting memory access statistics of said potential data sharing locations further comprises:

storing said memory access statistics in a searchable memory storage device.

11. An apparatus for testing the correct behavior of an integrated circuit comprising:

a processor;

a memory storage unit; and a bus communicatively coupling said processor and said memory storage unit;

wherein said memory storage unit includes a machine readable medium having instructions thereon for causing said apparatus to form a list of potential data sharing locations, collect memory access statistics of said potential data sharing locations, and form subsequent test case threads to test specialized processing conditions of said integrated circuit based on said memory access statistics of said potential data sharing locations.

12. The apparatus of claim 11, wherein said integrated circuit further comprises a processor under development.

13. The apparatus of claim 12, wherein said memory access statistics further comprise the size of the memory accesses that are performed on said data sharing location.

14. The apparatus of claim 12, wherein said memory access statistics further comprise the number of loads and stores that access said data sharing location.

15. The apparatus of claim 12, wherein said memory access statistics further comprise determining whether a memory access of said data sharing location was performed using virtual addressing.

16. The apparatus of claim 14, wherein said forming subsequent test case threads to test specialized processing conditions of said integrated circuit comprises forming a testcase thread that accesses one of said data sharing locations that has been accessed numerous times based on said memory access statistics.

17. The apparatus of claim 15, wherein said forming subsequent test case threads to test specialized processing conditions of said integrated circuit comprises forming a testcase thread that accesses one of said data sharing locations that was accessed using virtual addressing based on said memory access statistics.

18. An apparatus for testing the correct behavior of an integrated circuit comprising:

computer processing means;

memory means for storing data; and communications means for communicatively coupling said processing means and said memory means;

wherein said memory means includes a machine readable medium having instructions thereon for causing said apparatus to form a list of potential data sharing locations, collect memory access statistics of said potential data sharing locations, and form subsequent test case threads to test specialized processing conditions of said integrated circuit based on said memory access statistics of said potential data sharing locations.

19. The apparatus of claim 18, wherein said integrated circuit comprises a processor under development.

20. The apparatus of claim 19, wherein said memory access statistics further comprise the size of the memory accesses that are performed on said data sharing location.

21. The apparatus of claim 20, wherein said memory access statistics further comprise the number of loads and stores that access said data sharing location.

22. The apparatus of claim 20, wherein said memory access statistics further comprise determining whether a memory access of said data sharing location was performed using virtual addressing.

23. The apparatus of claim 21, wherein said forming subsequent test case threads to test specialized processing conditions of said integrated circuit comprises forming a testcase thread that accesses one of said data sharing locations that has been accessed numerous times based on said memory access statistics.

24. The apparatus of claim 22, wherein said forming subsequent test case threads to test specialized processing conditions of said integrated circuit comprises forming a testcase thread that accesses one of said data sharing locations that was accessed using virtual addressing based at least in part on said memory access statistics.

25. A computer readable program product comprising:

a data sharing processor evaluation mechanism that generates a list of data lines used by generated testcase threads of code, records memory access statistics of said data lines, and generates subsequent testcase threads that test specialized conditions based at least in part on said memory access statistics;

wherein said processor evaluation mechanism is capable of being distributed by a computer readable signal bearing media; and wherein said computer readable signal bearing media is a recordable type media.

26. A processor, comprising:

an integrated circuit that has been checked for the ability to process specialized data sharing conditions by processing a number of testcase threads that have been formed based on memory access statistics of previously used data lines.

27. A method for testing the correct behavior of an integrated circuit comprising:

forming a list of potential data sharing locations by selecting a data line from a list of data lines used by a previously generated thread, and by analyzing said data line for possible data sharing locations based on a bias hierarchy, said bias hierarchy includes:

initially checking said data line for false data sharing store locations;

checking said data line for false data sharing load operations after said false data sharing store locations have been identified; and checking for larger data sharing locations prior to checking for smaller data sharing locations;

collecting memory access statistics of said potential data sharing locations; and forming subsequent test case threads to test specialized processing conditions of said integrated circuit based on said memory access statistics of potential data sharing locations.

* * * * *